INVENTORS
RALPH C. ROE
JOSEPH LICHTENSTEIN

INVENTORS
RALPH C. ROE
JOSEPH LICHTENSTEIN
BY
*Ward Neal Haselton Orme McElhannon*
ATTORNEYS

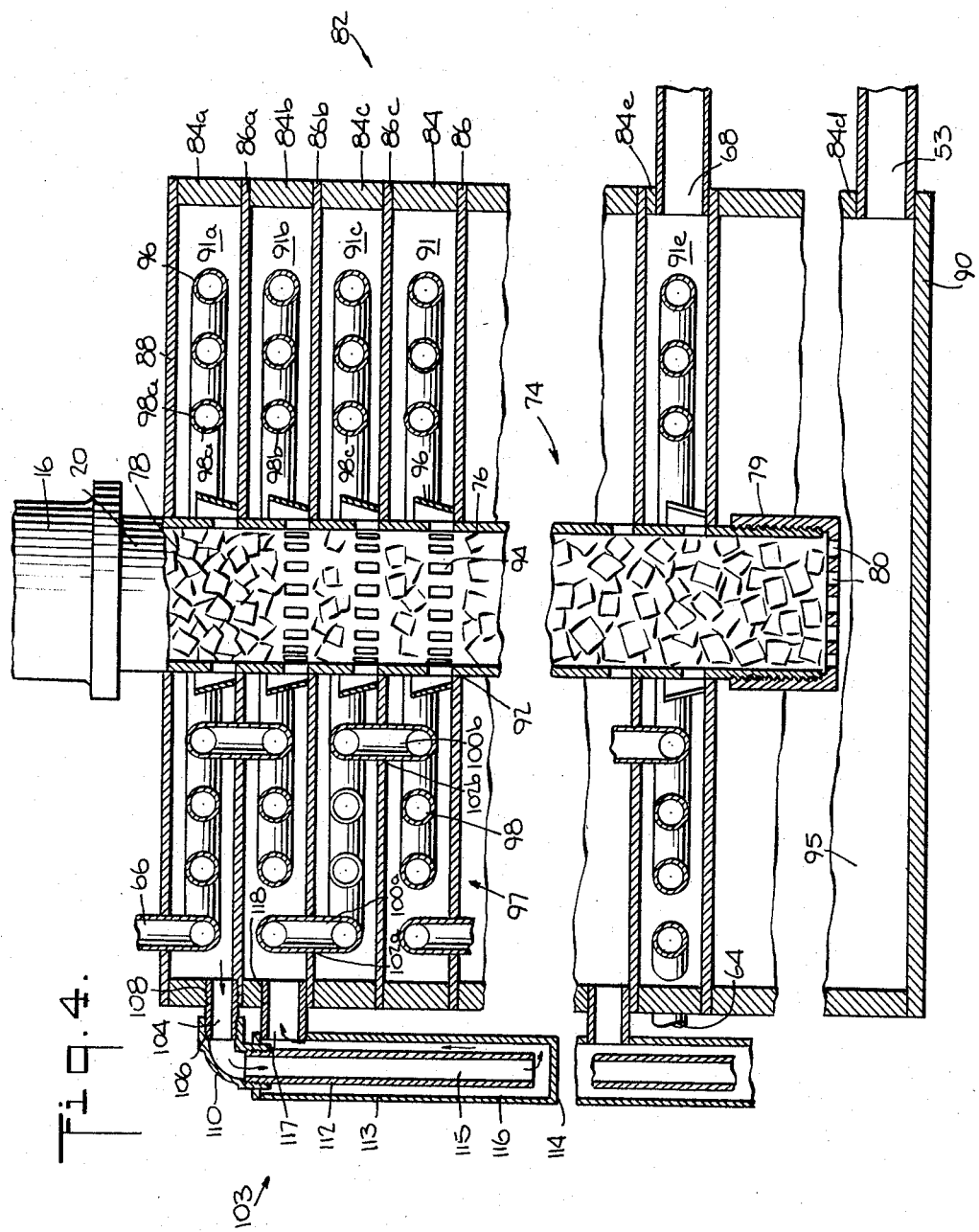

United States Patent Office 3,324,012
Patented June 6, 1967

3,324,012
LIQUID PURIFICATION BY SOLVENT DISTILLATION AND RECOVERY
Ralph C. Roe, Tenafly, N.J., and Joseph Lichtenstein, Bayside, N.Y., assignors, by mesne assignments, to Saline Water Conversion Corporation, a corporation of New York
Filed June 12, 1963, Ser. No. 287,409
10 Claims. (Cl. 203—11)

This invention relates to a method and apparatus for recovering substantially pure solvent from a solvent system or solution containing one or more dissolved non-volatile substances.

This invention is concerned with a liquid purification system which utilizes the concept of gradual or diffusion vaporization of solvent from a solution, and which is similar, in a generic sense, to the invention set forth in the application of Edward Charles Kehole and Elwood C. Walker, Ser. No. 242,785 filed Dec. 6, 1962, now Patent No. 3,214,349, wherein a heated solution such as saline water is disposed in falling thin film attitude over a body of packing in order to recover the solvent, such as pure water, by means of diffusion vaporization. This is to be distinguished from other systems which employ a rapid or violent flash vaporization process, for example.

Liquid purification systems embodying the present concept are particularly adapted, among other possible uses, for recovering potable water from the sea, brackish water or other sources of impure water. Such apparatus is particularly useful where relatively small or medium size installations are desired such as domestic or household units, small villages, or industrial plants.

In essence, the present invention includes a method of recovering solvent from a liquid solvent system containing dissolved non-volatile matter which comprises heating the liquid, so flowing the liquid downwardly through a packed column as to dispose the same in thin film attitude over the surface of the packing, maintaining an absolute pressure in the free space of the packing substantially equal to the saturation pressure of the solvent in the film at any point thereof, thus to induce diffusion vaporization of a portion of the solvent from the flowing film, withdrawing solvent vapor at a plurality of stages along the packed column below the point of introduction of heated vapor, and condensing the vapor thus withdrawn.

In the performance of this method, we utilize a packed column similar to that shown and described in copending application Ser. No. 242,785 already referred to and the principle of operation of which is there set forth. However, according to the present concept, the column is modified and employed in a novel combination that also constitutes part of this invention.

Thus, we provide a system of the class described utilizing such a column, means supplying heated liquid from a source to the head of the column whereby the liquid flows downwardly over the surface of the packing therein, means disposed below the packing collecting liquid discharged from the foot of the packing, means inducing the vapor formed from the down flowing liquid to flow cocurrently with the liquid through the column, means disposed at a plurality of stages along the column for withdrawing vapor therefrom, means condensing the vapor and means collecting the condensate.

As the saline water flows down over the packing, vapor diffuses very gradually into the free space at conditions of substantial equilibrium. Since vaporization is occurring at each incremental level, the volume of vapor increases towards the foot of the packing as a result of the vaporization at lower points, and the movement of vapor formed above into the lower free space. The volume of water introduced to the head of the column decreases as it descends due to vaporization. The vapor formed in the free space thus increases and ultimately chokes the vapor passages creating a pressure drop down through the column. As pointed out hereinbefore, according to the present system means are provided at a plurality of points along the column for withdrawing this vapor therefrom to reduce the choking of the vapor passages. At any given point the absolute pressure in the free space is substantially equal to or just very slightly below the saturation pressure of the water in the column at that point. Accordingly, very little energy in excess of the latent heat of vaporization is expended in transfer from liquid to vapor, and this is the condition referred to herein as diffusion vaporization as distinguished from the violent flashing which occurs where the absolute pressure is substantially below the saturated pressure of the water.

A feature of the invention resides in the provision of an improved liquid purification system which is independent of the type of mineral contained in the liquid being purified and even may be used with sewage affluent, and which when purifying salt or brackish solutions is independent of the degree of salinity of the supply water.

Additionally, the present invention provides an improved liquid purification system which simplifies the withdrawal of the vapor formed therein, which provides for a plurality of vapor outlets and thereby reduces the overall apparatus dimensions, which employs a plurality of stages for the withdrawal of vapor, which allows for the withdrawal of condensables at various stages so that they will not accumulate within the apparatus, which allows for the withdrawal of non-condensables, and which renders the condenser more efficient and thereby improves the heat transfer efficiency.

Moreover, another feature of the invention resides in the provision of an improved liquid purification system which permits recirculation of the solution of brine, and which permits the utilization of air-type coolers, factors which are particularly important where other cooling media are not readily available.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Embodiments of the invention have been chosen for purposes of illustration and description, and are shown in the accompanying drawings, forming a part of the specification, wherein:

FIG. 4 is a sectional elevation taken along line 4—4 of FIG. 2;

Figure 1:
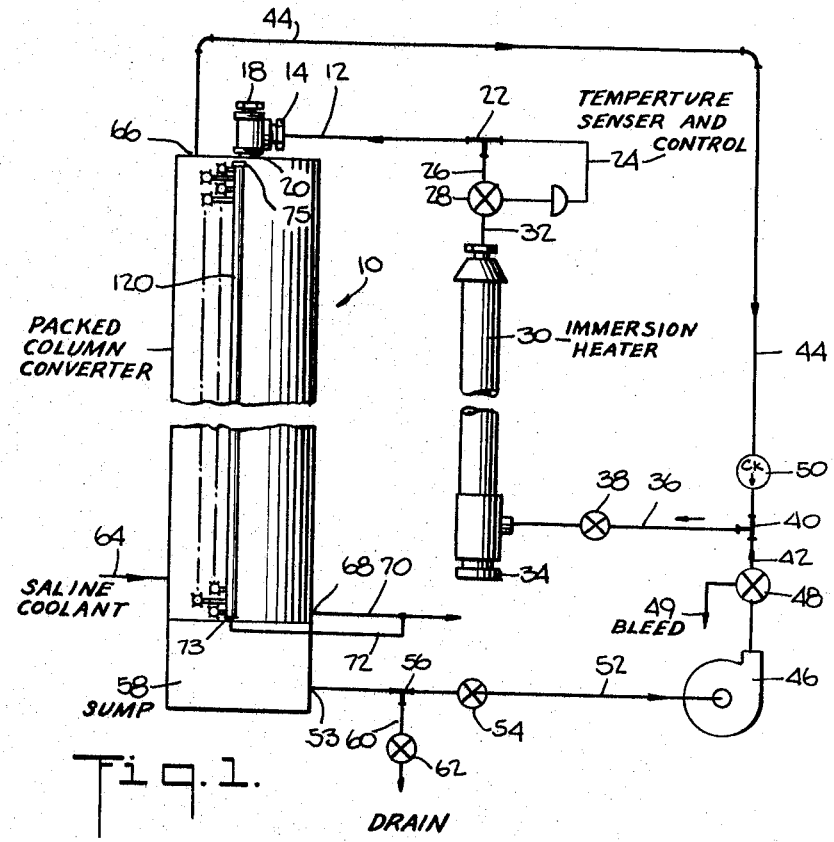
FIG. 1 is a schematic elevation showing one embodiment of a liquid purification system in accordance with the present invention.

In the embodiment of the invention illustrated in FIGS. 1 to 6 and with particular reference to FIG. 1, the liquid purification system includes a converter 10 to which liquid solution is delivered from a pipe 12 through a bushed T 16 plugged at 18 and an inlet pipe 20. The pipe 12 is connected to a T fitting 22 which is also connected to pipes 24 and 26, the latter being connected to a temperature control valve 28, and pipe 24 acting as a temperature sensing line for the control valve 28. We connect a conventional immersion heater 30 to the control valve 28 by means of a pipe 32, and a conduit box 34 is provided at the lower end of the immersion heater 30 for receiving electrical power from any suitable source (not shown).

Liquid solution is delivered to the immersion heater 30 through heater feed line 36 which is valved at 38. The other end of the feed line 36 is connected to a T fitting 40 to which pipes 42 and 44 are also connected. Pipe 42 receives liquid solution from the discharge of a circulating pump 46 and is provided with a valve 48 for bleed-off or recirculation purposes. The pipe 44 extends from the T 40 to the cooling liquid outlet 66 of the converter 10 and a check valve 50 is interposed in this line for purposes of checking the flow of liquid in the direction towards the converter. Liquid solution is delivered to the suction end of the circulating pump 46 from the sump 58 of the converter 10 by means of pipe line 52 which contains a valve 54 and a T fitting 56. The third leg of the T fitting 56 leads to a drain via drain line 60 valved at 62

The converter 10 is further provided with a cooling liquid inlet 64 which delivers liquid solution to the system from an outside source (not shown). Such cooling liquid passes through the condenser coils of the converter 10 and flows through the cooling liquid outlet 66 to pipe 44. The pure condensate or system product passes through the outlet 68 of the converter 10 to pipe 70 which carries it to a convenient collection tank through a wet pump, for example (not shown). Also, interconnected with pipe 70 is pipe 72 which leads from a vent standpipe disposed within the converter 10 for collecting noncondensables entrapped in and carried with the solution being purified.

The operation of the system as thus far described is as follows. When the liquid purification system of FIGS. 1 to 5 is purifying a liquid solution such as saline water for example, the saline water enters the converter 10 via the cooling water inlet 64 and first acts as a cooling agent while being passed through condenser coils about which more will be said hereinafter, to the cooling water outlet 66. Then the saline water passes through pipe 44, through the check valve 50 to the T 40, from whence it passes to the immersion heater 30 via the heater feed line 36 and valve 38. After the solution is heated in the immersion heater 30, it is delivered to the inlet pipe 20 of the converter 10 via pipe 32 temperature control valve 28, pipe 26 and pipe 12. The temperature control valve 28 is provided with a sensing pipe or line 24 in order to regulate the volumetric flow of heated saline water therethrough to maintain a substantially preselected constant temperature of the discharge therefrom of the order of 150° F., for example. As will be discussed more fully hereinafter, a relatively large volume of saline water enters the inlet 20 of the converter 10 where a relatively small percentage thereof is converted into vapor by means of gradual or diffusion vaporization of the water vapor from the heated saline water. Such vapor is condensed in the condenser portion of the converter 10 and is discharged at the bottom thereof in the form of condensed pure water at 68. It should be appreciated that while the salinity of the product is controllable as described in copending application Ser. No. 242,785 already referred to, we have actually produced by the present concept water in a very pure condition, the salinity content thereof being as low as 2 p.p.m. or lower from saline water. The vast bulk of the solution entering the inlet 20 of the converter 10 passes through the outlet 53 of the converter 10 and passes to pipe 52. A portion of such saline water passes through the T 56 to the drain line 60 while the remainder is delivered to the inlet of the circulating pump 46 and thence the pipe line 42 via valve 48, through the T fittting 40 and on to the heater feed line 36 where it is again led to the heater 30. It will be appreciated that a portion of the saline water may be recirculated through the system several times, a factor which is extremely important in location where the water supply is relatively limited.

Figure 3:
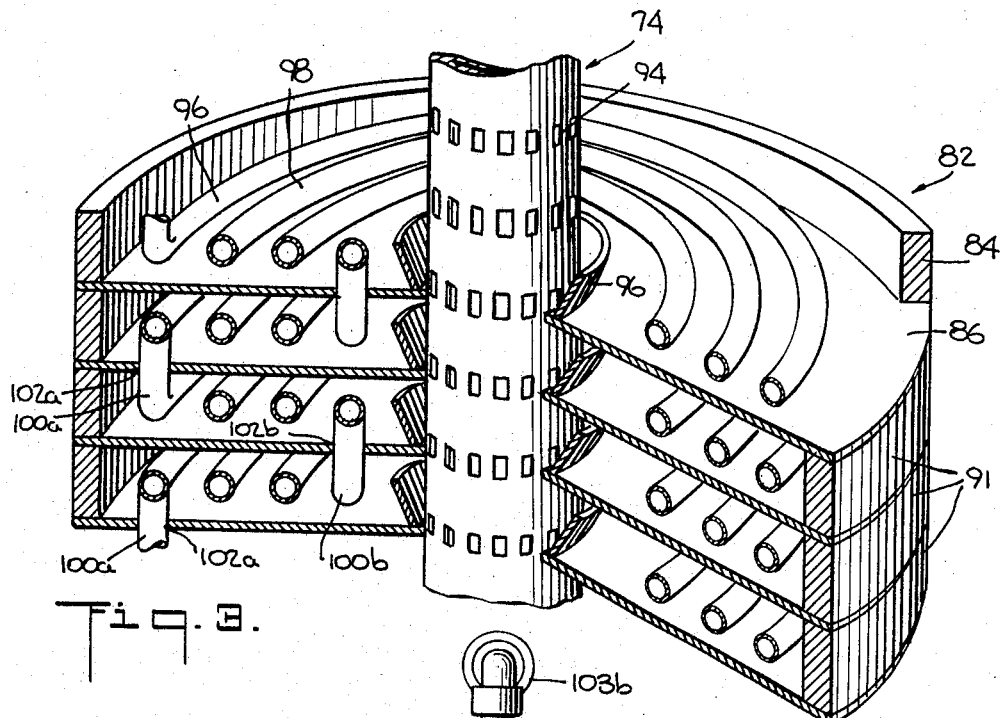
FIG. 3 is a perspective view partially broken away to reveal the internal construction of the converter.
Figure 2:
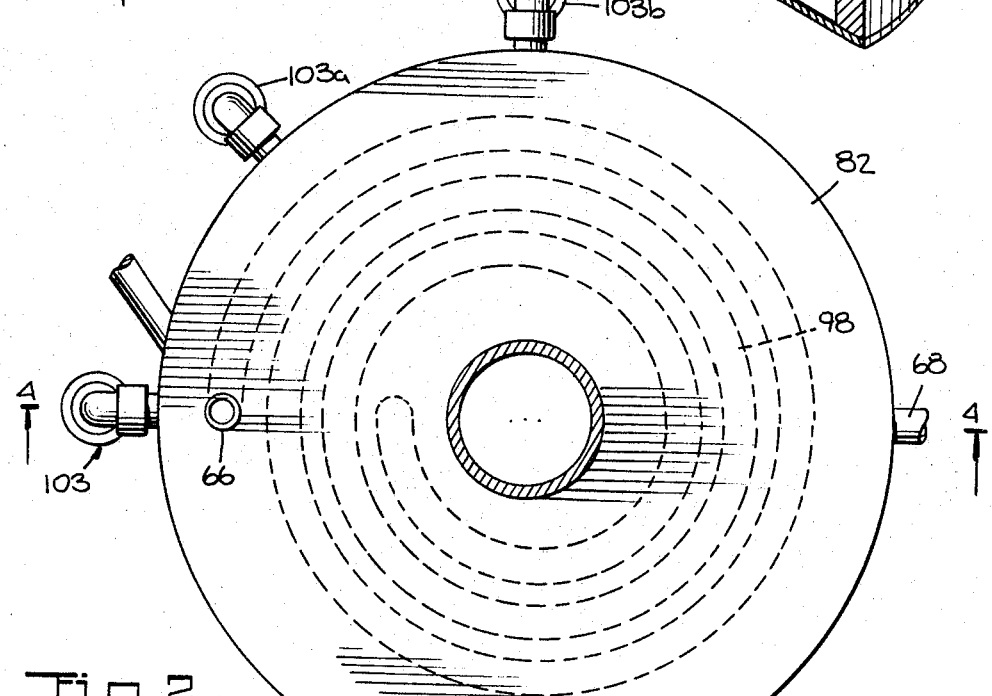
FIG. 2 is a plan view of a converter utilized in the liquid purification system.

We will now describe the converter in more detail and for this purpose, attenuation is inverted to FIGS. 2, 3 and 4. Pipe fitting 16 is connected to the tower or column 74 by means of inlet 20 (FIG. 4). In the illustrated embodiment, the column 74 is provided with a wall 76 of generally cylindrical configuration and is filled with packing material 78 which may be chosen from a wide variety of materials which are readily available, including by way of example Raschig rings, diaphragm rings, spiral rings, partition rings, Steadman packing of any type, McMahon packing, broken solids, for example, stoveware or pottery, spirals, Lessing rings, Prym rings, Berl saddles, as well as turnings such as steel wool, etc., among many others. These materials may be arranged in packed, stacked or dumped relationship in the column. Thus, virtually any packing material which is employed in a distillation or adsorption unit may be employed. However, it is essential that the packing provide free space for the formation of vapor. The restriction provided by the packing causes in the vapor a gradual pressure drop in the direction toward the foot of the column which enables gradual diffusion and vaporization. The packing material 78 is retained within the column 74 by means of an end cap 79 which is threadedly connected to the foot of the column. Such cap 79 contains a plurality of apertures or openings 80 in the bottom face thereof for the passage of saline water therethrough.

The converter 10 is provided with an outside housing designated generally at 82 comprising a plurality of rings 84, the top three of which are designated by the numerals 84a, 84b and 84c and the bottom two rings being designated by the numerals 84d and 84e. Interposed between each ring and its next adjacent ring is a plate 86, the top three of which are designated by the numerals 86a, 86b and 86c. The top of the converter is closed by means of a cover plate 88 and the bottom thereof is closed by means of a bottom plate 90. The plates 86, 88 and 90 are fixedly adhered to their next adjacent housing ring 84 in sealed relationshiup thereto as by means of fusion, welding or brazing, for example, or the entire assembly of plates and rings may be integrally formed as of plastic. Thus, it is seen that the converter 10 is divided into a plurality of longitudinally disposed stages 91 which are in sealed relationship one to the other. Each of the plates 86 and 88 are provided with a centrally disposed aperture 92 through which the column 74 passes having its wall 76 fixedly adhered thereto in sealed relationship. The lower portion of the column 74 and the end cap 79 are disposed in spaced apart relation to the bottom plate 90 in order to provide a sump 95 in which the uncondensed saline water is collected for delivering through the outlet 53 in the housing 82. In each of the stages 91 of the converter 10, a plurality of spaced apart apertures or vapor outlets 94 are disposed in the column wall 76 adjacent their respective plates 86. An angularly disposed ring-like deflecting plate or weir 96 is positioned in each stage 91 adjacent the column wall 76 in proximity to the vapor outlets 94, the bottom edge of which is fixedly adhered to and forms a seal with the plates 86.

Each stage 91 is provided with a pancake type condenser 97 which comprises a cooling coil 98 of spiral configuration. The cooling coils 98 of adjacent stages are interconnected one to the other by means of connecting elbows 100a and 100b which pass through apertures 102a and 102b, respectively, in the plates 86. For example, as illustrated in FIG. 4, in stage 91c coupling 100b enters through aperture 102b in plate 86c and connects with cooling coil 98c which extends spirally outwardly and connects with coupling 100a which passes through aperture 102a in plate 86b to stage 91b. In this stage coupling 100a connects with cooling coil 98b which extends spirally inwardly and connects with coupling 100b which passes through aperture 102b in plate 86a to stage 91a. This same pattern is repeatedly employed throughout the entire length of the converter 10 so that the cooling water which enters the cooling water inlet 64 passes upwardly through each stage of the condenser 97 and is discharged through the cooling water outlet 66 from the uppermost stage 91a. (FIGS. 1 and 4).

It should be understood that each stage 91 of the converter 10 operates at a different pressure and temperature and, therefore, sealing means are provided between successive stages. While other types of seals may be employed, a water seal is ideally suited for this purpose because there are no valves or moving parts requiring operational manipulations or maintenance. Referring to FIG. 4, the condensed vapor or pure water passes outwardly in each stage 91 to the water seal inlet 104 which comprises a nipple 106 having one end connected in an aperture 108 in the ring 84 and the other end connected to an elbow 110. A vertically extending short tube or pipe 112 is connected to the elbow 110 by means of internal threads provided therein. Pipe 113, being coaxially disposed with respect to pipe 112, is connected to the outer surface of the elbow 110 and is provided with an end cap 114 so that an internal passage 115 is formed for the downwardly flowing liquid and an external passage 116 is formed between the pipes 112 and 113 for the upwardly flowing liquid. The water seal outlet 117 is formed by means of a nipple 118, one end of which passes through the side wall of pipe 113 and the other end of which passes through the ring 84. In operation, liquid condensate passes into the water seal through the inlet 104, thence downwardly through the passage 115, thence upwardly through the passage 116 and thence through the outlet 117 into the next stage, thereby providing a leg of water extending from the end cap 114 to the lower lip of the water seal outlet 117 which effectively seals one stage from the next adjacent stage. In order to avoid interference with each other, the water seals between adjacent stages are circumferentially staggered in a downwardly extending spiral-like manner around the circumference of the housings 82 as shown by the numerals 103a and 103b in FIG. 2.

Figures 5, 6:
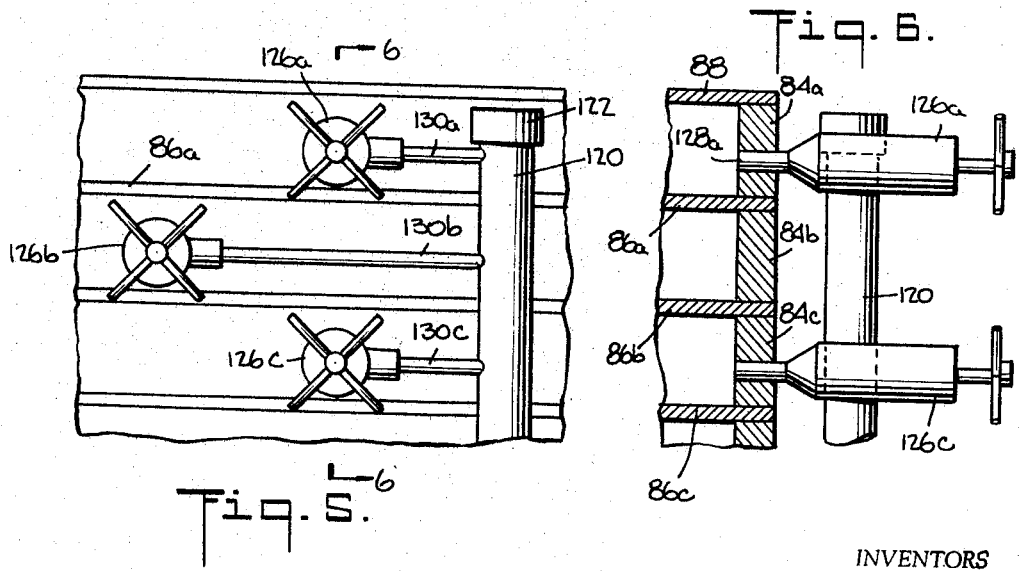
FIG. 5 is an enlarged fragmentary elevation of a portion of the converter showing the vent standpipe and valving therefor.
FIG. 6 is a sectional view taken along line 6—6 of FIG. 5.

As shown in FIGS. 1 and 2, a vent standpipe 120 is positioned adjacent the housing 82 and is disposed in parallel relationship thereto for collecting the non-condensables entrapped or carried by the saline water passing downwardly through the column 74. The top of the standpipe 120 is sealed by means of a vent cap 122 and the bottom thereof is provided with an outlet 73 to which is connected pipe 72 leading to the pipe 70 (FIG. 1). Interposed between the vent standpipe 120 and the housing rings 84 are a plurality of needle valves, three of which are shown at 126a, 126b and 126c in FIG. 5. Each needle valve is provided with an inlet and an outlet, for example, valve 126a has an inlet 128a and an outlet 130a, valve 126b has an inlet 128b and an outlet 130b, and valve 126c has an inlet 128c and an outlet 130c (FIGS. 2, 5 and 6). It will be understood that the passages through the needle valves are sized so that non-condensables may pass therethrough but water vapor will not pass therethrough. Alternatively, the needle valves may be replaced by fixed diameter orifices, if desired, but we prefer to employ a needle valve in the uppermost stage where most of the non-condensables will be drawn off, and fixed diameter orifices in the remaining stages.

It will be appreciated that, in operation, the saline water passes downwardly through the column 74 at a continuously decreasing temperature due to the vaporization process. Simultaneously, the cooling water passes upwardly (counterflow to the saline water) through the condenser 97 at a continuously increasing temperature due to the condensing process. In each stage 91 there is a temperature differential between the saline water and the cooling water and a corresponding pressure differential so that a portion of the saline water is vaporized in the column 74 and passes outwardly through the vapor outlets 94 to the condenser 97 where it is condensed in the form of pure water. That is, vapor is formed by the diffusion vaporization process in the interstices or free spaces in the packing 78 and flows downwardly and outwardly through the vapor outlets 94, and thence, it is deflected upwardly by the weirs 96. Said weirs deflect any saline water that may pass through the vapor outlets 94 back into the column 74 and, also, the weirs prevent the passage of condensate or pure water into the column 74.

As the vapor passes outwardly, it is cooled and condensed forming pure water which continues to flow outwardly to the inlet 104 of the water seal 103, through which it passes to the outlet 117 thereof where it is discharged into the next subsequent stage 91. The condensate or pure water continues downwardly in this manner through each stage 91 of the converter 10 so that all of the pure water is collected in the last stage 91e and is discharged through the outlet 68. Since the vapor is collected and condensed at each stage, the latter stages of the converter 10 are much smaller volumetrically than would be required if the pure water remained in the vapor state while passing therethrough. The remainder of the saline water completes its passage downwardy through the column 74 and passes through the outlets 80 in the bottom cap 79 to the sump 95 where it is collected for discharge through the outlet 53 (FIG. 4).

In a typical liquid purification system the following values may be selected to obtain the desired results:

Product (pure water) 9.5 gallons per hour
Number of stages 91=50
Saline water at the inlet 20:
    Quantity (flow)=2.2 gallons per minute
    Temperature =150°
Saline water at the outlet 80: Temperature=75.5° F.
Saline water—approximate temperature: Differential between stages=1.5° F. and the corresponding vapor pressure differential=approximately .0433 p.s.i.
Cooling water at the inlet 64:
    Quantity (flow)=2.2 gallons per minute
    Temperature=70
Cooling water at the outlet 66: Temperature=144.5
Cooling water—approximate temperature: Average differential between stages=1.5° F. and the corresponding vapor pressure differential=approximately .0433 p.s.i.
In a given average stage: Terminal temperature differential between the cooling water and the saline water=4.0° F.
Power:
    Heater temperature rise 5.5° F.
    Total power used by heater 30=1.75 kw.
    Kilowatts required per gallon of pure water produced=0.184 kw.

Figure 7:
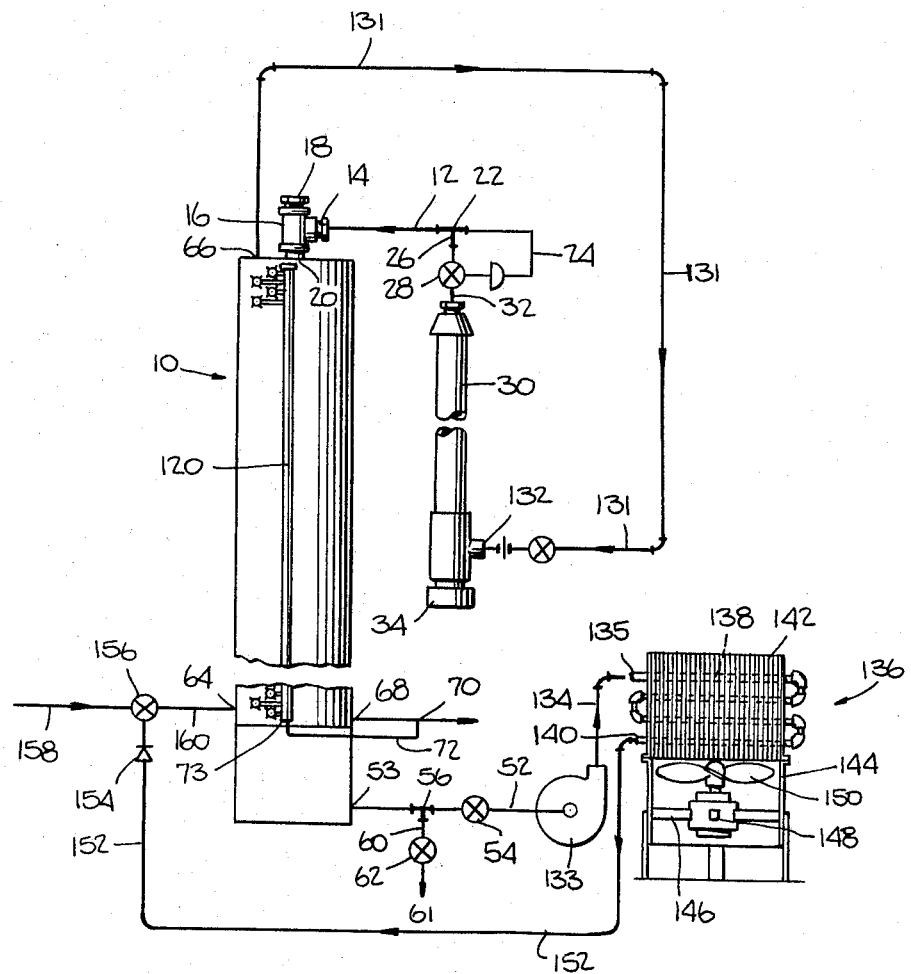
FIG. 7 is a schematic elevation of another embodiment of a liquid purification system in accordance with the present invention.

Referring next to the embodiment shown in FIG. 7, this embodiment is particularly suitable for locations where the water supply is relatively scarce. It will be noted that the same numerals are given to the parts which are identical to their corresponding parts used in connection with the description of the system of FIG. 1. The saline water is delivered to the converter 10 from the immersion heater 30 in a manner similar to that described in connection with the system illustrated in FIG. 1, namely, via pipe 32, temperature control valve 28, pipe 26, T fitting 22, pipe 12, T fitting 16 and inlet 20. The immersion heater 30 receives the saline water through its inlet 132 from pipe 131 which is directly connected to the cooling water outlet 66 of the condenser 97. The condensate or pure water passes through the outlet 68 of the converter 10 and through pipe 70 to a suction pump (not shown) and on to a convenient source of storage (not shown). The vent standpipe 120 discharges the non-condensables through its outlet 73 into pipe 72 which is interconnected with pipe 70, in a manner similar to that described in connection with the system of FIG. 1. The remainder of the saline water leaves the converter 10 through the outlet 53 and passes to a circulating pump 133 through pipe 52 containing a T fitting 56 and a valve 54. The third connection of T fitting 56 leads to a drain (not shown) through drain line 60, valve 62 and pipe 61. Circulating pump 133 receives saline water from pipe 52 and discharges it into pipe 134 which leads to the inlet 135 of an air cooler designated generally at 136 (FIG. 7). The air cooler 136 comprises a coil 138 through which circulates the saline water to the outlet 140. Fins 142 are provided for deflecting the air passing therethrough to facilitate the heat transfer. The air cooler 136 is provided with a frame 144 to which is attached a fan motor support bracket 146 for mounting a fan motor 148 which is in driving engagement with a fan 150. Thus, air enters at the bottom of the air cooler and is blown through the fins 142 by means of the fan 150. The cooled saline water passes through the outlet 140 to pipe line 152, thence through a check valve 154 to a two-way plug valve 156. The two-way plug valve 156 is adapted to either receive liquid solution from the pipe line 152 or from a supply source 158 and direct same to pipe 160 and thence through the inlet 64 of the condenser 97. Thus, it is seen that the same liquid solution or saline water is recirculated after being cooled by the air cooler 136 so that a relatively small amount of make-up or additional water is required to be supplied from supply source 158. It has been found that the saline water may be recirculated until it contains approximately four times the initial concentration of salinity therein. Hence, in localities where the water supply is relatively scarce this system is particularly advantageous.

It will be understood that various changes in the details, materials and arrangements of parts which have been herein described and illustrated in order to explain the nature of the invention, may be made by those skilled in the art within the principle and scope of the invention, as expressed in the appended claims.

We claim:

1. A method for continuously recovering substantially pure solvent from a liquid solvent system containing dissolved non-volatile matter, which comprises: heating the liquid, so flowing the heated liquid downwardly through a packed column as to dispose the same in thin film attitude over the surface of the packing, maintaining an absolute pressure in the free space of the packing substantially equal to the saturation pressure of the solvent in the film at any point thereof, thus to induce diffusion vaporization of a portion of the solvent from the flowing film, inducing the solvent vapor so produced to flow through the free space of the packing cocurrently with the flowing film, radially withdrawing solvent vapor at a plurality of stages disposed along said packed column below the point of introduction of heated liquid thereto and condensing the so withdrawn vapor.

2. A method for continuously recovering substantially pure solvent from a liquid solvent system containing dissolved non-volatile matter, which comprises: heating the liquid, so flowing the heated liquid downwardly through a packed column as to dispose the same in thin film attitude over the surface of the packing, maintaining an absolute pressure in the free space of the packing substantially equal to the saturation pressure of the solvent in the film at any point thereof, thus to induce diffusion vaporization of a portion of the solvent from the flowing film, inducing the solvent vapor so produced to flow through the free space of the packing cocurrently with the flowing film, radially withdrawing solvent vapor at a plurality of stages disposed along said packed column below the point of introduction of heated liquid thereto and condensing the so withdrawn vapor, said vapor being condensed in each stage by means of a condenser disposed adjacent the column, passing the so condensed vapor downwardly through the stages disposed therebelow and collecting such condensed vapor at the foot of the column adjacent the last stage, collecting the concentrated liquid solution leaving the foot of the column and passing a portion of same to said heater, introducing a liquid cooling solution into said condenser for cooling purposes.

3. A method as set forth in claim 2 including withdrawing non-condensables being carried in said solvent vapor and collecting same in a vent standpipe disposed adjacent said column.

4. A method for continuously recovering substantially pure solvent from a liquid solvent system containing dissolved non-volatile matter, which comprises: heating the liquid, so flowing the heated liquid downwardly through a packed column as to dispose the same in thin film attitude over the surface of the packing, maintaining an absolute pressure in the free space of the packing substantially equal to the saturation pressure of the solvent in the film at any point thereof, thus to induce diffusion vaporization of a portion of the solvent from the flowing film, inducing the solvent vapor so produced to flow through the free space of the packing cocurrently with the flowing film, radially withdrawing solvent vapor at a plurality of stages disposed along said packed column below the point of introduction of heated liquid thereto and condensing the so withdrawn vapor each of said stages having a plurality of vapor outlets, said step of condensing the so withdrawn vapor further comprises deflecting said water vapor by means of weirs positioned adjacent said outlets, passing said water vapor in close proximity to interconnected cooling coils disposed in each of said stages, thus to condense said water vapor, passing said condensed water vapor to the next subsequent stage through a water seal for maintaining a pressure and temperature differential between adjacent stages, collecting said water vapor at the last stage and passing same through a condensed water vapor outlet.

5. A method for continuously recovering substantially pure solvent from a liquid solvent system containing dissolved non-volatile matter, which comprises: heating the liquid, so flowing the heated liquid downwardly through a packed column as to disposed the same in thin film attitude over the surface of the packing, maintaining an absolute pressure in the free space of the packing substantially equal to the saturation pressure of the solvent in the film at any point thereof, thus to induce diffusion vaporization of a portion of the solvent from the flowing film, inducing the solvent vapor so produced to flow through the free space of the packing cocurrently with the flowing film, radially withdrawing solvent vapor at a plurality of stages disposed along said packed column below the point of introduction of heated liquid thereto and condensing the so withdrawn vapor, each of said stages having a plurality of vapor outlets, said step of condensing the so withdrawn vapor further comprises deflecting said water vapor by means of weirs positioned adjacent said outlets, passing said water vapor in close proximity to interconnected cooling coils disposed in each of said stages, thus to condense said water vapor, passing said condensed water vapor to the next subsequent stage through a water seal for maintaining a pressure and temperature differential between adjacent stages, collecting said water vapor at the last stage and passing the same through a condensed water vapor outlet, said method further including the steps of separately collecting the downwardly flowing saline water at the foot of said column and circulating same to said heater, introducing saline water for cooling purposes into said cooling coils at the cooling water inlet disposed adjacent said last stage, passing said saline water upwardly through said interconnected coils and discharging said saline water from the first stage at a cooling water outlet, and circulating said saline water to said heater.

6. In a recovery system of the class described, a column containing supported packing material, means supplying heated liquid from a source to the head of said column whereby the liquid flows downwardly over the surface of the packing therein, means disposed below said packing collecting liquid leaving the foot of said packing, means inducing the vapor formed from the down flowing liquid to flow cocurrently with said liquid through the column, means for removing directly from the column at each of a plurality of stages disposed along said column a portion of the vapor formed in said column, means for condensing the vapor formed, and collecting means for the condensate.

7. In a liquid purification system of the class described, a column containing supported packing material, means supplying heated liquid from a source to the head of said column whereby the liquid flows downwardly over the surface of the packing therein, means disposed below said packing for collecting liquid leaving the foot of said packing, means for removing a portion of the vapor formed at each of a plurality of stages disposed along said column, condensing means for condensing the vapor so formed, sealing means interposed between each of said stages and its next adjacent stage, and collecting means for the condensate so formed.

8. In a purification system of the class described, a column containing supported packing material, means supplying heated liquid from a source to the head of said column whereby the liquid flows downwardly over the surface of the packing therein, means disposed below said packing for collecting liquid leaving the foot of said packing, means inducing the vapor formed from the downwardly flowing liquid to flow cocurrently with said liquid through the column, a plurality of stages disposed along said column each including vapor outlet means in said column for removing a portion of the vapor formed, a weir disposed adjacent said vapor outlets at each of said stages, condenser coils disposed within each of said stages and interconnected to the next adjacent stage whereby cooling fluid may enter the last stage and pass through said coils to be discharged from the first stage, and collecting means for the condensate so formed.

9. In a liquid purification system of the class described, a column containing supported packing material, means supplying heated liquid from a source to the head of said column whereby the liquid flows downwardly over the surface of the packing therein, means disposed below said packing collecting liquid leaving the foot of said packing, a plurality of stages disposed along said column, vapor outlets for removing a portion of the vapor formed at each of said stages, a weir disposed adjacent said outlets in each of said stages, condenser means disposed in each of said stages, water sealing means interposed between each stage and its next adjacent stage whereby condensed vapor forms a leg of water while passing to the next adjacent stage, a condensed liquid outlet positioned in the last of said stages, a vent standpipe, means for interconnecting each of said stages with said vent standpipe in restricted gaseous communication, and an outlet for said vent standpipe.

10. In a liquid purification system of the class described, a column containing packing material, means delivering heated saline water to the head of said column whereby the water flows downwardly in thin film attitude over the surface of the packing therein, means regulating the quantity of saline water so delivered, means maintaining a selected pressure differential between the absolute pressure in the free space and the saturated pressure of the saline water film at any given point in the packing thus to effect diffusion of vapor from the saline water into the free space of the packing, means for removing a portion of the vapor formed at each of a plurality of stages disposed along said column, condenser means disposed within each of said stages, sealing means interposed between each stage and the next adjacent stage through which passes said condensed vapor, a condensed vapor outlet positioned within the last of said stages, a sump for collecting saline water leaving the foot of the packing, an outlet disposed in said sump, a cooling saline water inlet to said condenser means and a cooling saline water outlet from said condenser means, cooling means, means establishing fluid flow communication between said outlet disposed in said sump and said cooling means, means establishing fluid flow communication between said cooling means and said cooling saline water inlet, a heater, means establishing fluid flow communication between said cooling saline water outlet and said heater, and means establishing fluid flow communication between said heater and said means for delivering heated saline water to the head of said column.

References Cited

UNITED STATES PATENTS

| | | | |
|---|---|---|---|
| 498,085 | 5/1893 | Schalitz | 159—13 |
| 565,637 | 8/1896 | Rowland | 159—13 |
| 909,028 | 1/1909 | Schalitz | 159—18 |
| 2,894,879 | 7/1959 | Hickman | 202—45 |
| 2,999,795 | 9/1961 | Yagi et al. | 202—45 |
| 3,146,177 | 8/1964 | Chalmers et al. | 203—11 X |
| 3,165,452 | 1/1965 | Williams | 159—18 X |
| 3,214,349 | 10/1965 | Kehoe et al. | 203—89 X |

NORMAN YUDKOFF, *Primary Examiner.*

J. SOFER, *Assistant Examiner.*